United States Patent [19]

Phipps

[11] 3,897,703
[45] Aug. 5, 1975

[54] UNIVERSAL SOCKET

[76] Inventor: Olin G. Phipps, 3944 Tuller Ave., Culver City, Calif. 90230

[22] Filed: Feb. 8, 1974

[21] Appl. No.: 440,845

[52] U.S. Cl. .......................................... 81/177 UJ
[51] Int. Cl. ............................................. B25b 13/00
[58] Field of Search ................................. 81/177 UJ

[56] References Cited
UNITED STATES PATENTS

| | | | |
|---|---|---|---|
| 2,354,184 | 7/1944 | Daniel | 81/177 UJ X |
| 3,232,151 | 2/1966 | Blachowski | 81/177 UJ |
| 3,788,169 | 1/1974 | Nakayama | 81/177 UJ |

*Primary Examiner*—Al Lawrence Smith
*Assistant Examiner*—James G. Smith
*Attorney, Agent, or Firm*—Robert C. Comstock

[57] ABSTRACT

A universal socket for tools, tool extensions and other applications. The socket assembly includes an attachment having means for connection to a tool. A drive member has a socket for engaging the nut or head of a fastening member. The attachment is connected to the drive member by a universal connection which comprises a hex-ball mounted in a hexagonal socket. The hex-ball has six sides, each of which is arcuate or spherical in a longitudinal plane but straight in a transverse plane. The hex-ball is capable of universal pivoting movement within the hexagonal socket, but cannot rotate within the socket. Upon rotation of the attachment by the tool, the rotational pressure is equally applied against all six corners of the hex-ball to cause simultaneous rotation of the hex-ball and drive member. Since no pins are used, danger of breakage is eliminated.

1 Claim, 6 Drawing Figures

PATENTED AUG 5 1975　　　　　　　　　　　　　　3,897,703

UNIVERSAL SOCKET

BACKGROUND OF THE INVENTION

1. Field of the Invention:

The invention relates to a universal socket for tools, tool extensions and other applications. Description of the Prior Art:

There are a number of universal sockets now in use which are of the ball and socket type to provide the desired universal movement, but which have one or more pins extending through or projecting from the ball in order to hold it against rotation within the socket. All of the rotational pressure is exerted upon the pins, which are likely to break and which can thereby cause injury to the user.

SUMMARY OF THE INVENTION

The present invention relates to a universal socket device in which the ball which provides the desired universal movement is a unique combination of ball and hexagon. It is rounded like a ball along the major portion of its longitudinal axis, so that it can be freely pivoted within its socket to provide any desired angular movement or position. At the same time, however, it is hexagonal along its transverse axis and accordingly cannot be rotated transversely within its socket. The six corners provided by its hexagonal shape engage the six corners of the hexagonal socket in which it is mounted. The rotational pressure is thereby divided equally between six points, so that there is no possibility of breakage of he type which occurs with the prior art pinheld devices.

The hexagonal ball when mounted within a conventional straight-sided hexagonal socket is capable of universal pivoting movement in any desired direction, but cannot be rotated without simultaneously rotating the socket member in which it is mounted.

It is accordingly the primary object of the invention to provide a universal socket for tools, tool extensions, and other suitable applications which is a distinct improvement over the prior art and which provides numerous advantages and benefits, such as improved strength and durability.

Another object of the invention is to provide a ball and socket construction which affords universal pivotal movement of one member with respect to the other, while preventing any rotational movement of such member with respect to the other.

A more particular object of the invention is to provide a device of the type described in which no pins are used, so that there is no danger of breaking or shearing such pins in use.

Another object of the invention is to provide such a device which is simpler both in its structure and in its operation than prior art devices.

It is also among the objects of the invention to provide a device of the type described which has all of the advantages and benefits set forth above and described in detail hereinafter in this specification.

The invention also comprises such other objects, advantages, and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE PREFERRED EMBODIMENT

Figure 1:
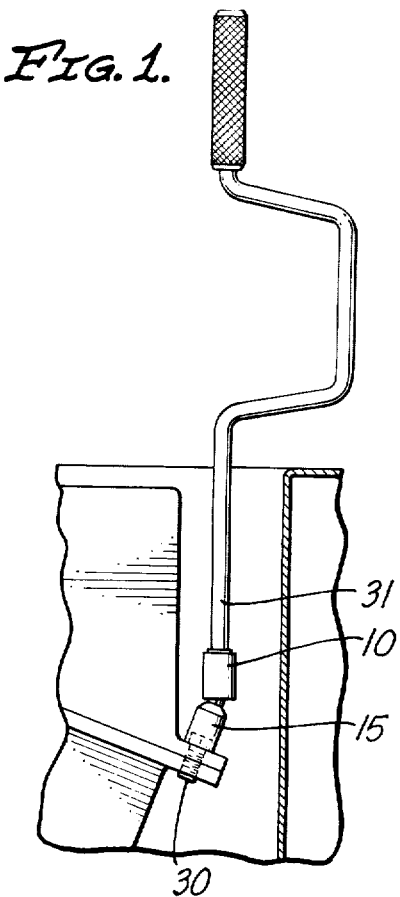
FIG. 1 is an elevational view on a reduced scale showing the device in use in a typical application.
Figure 2:
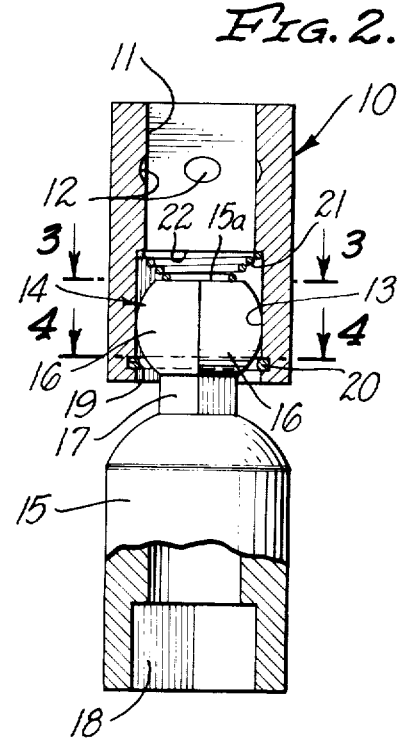
FIG. 2 is a side elevational view of the socket device, with the upper portion shown in section and the lower portion shown partly in section.
Figure 3:
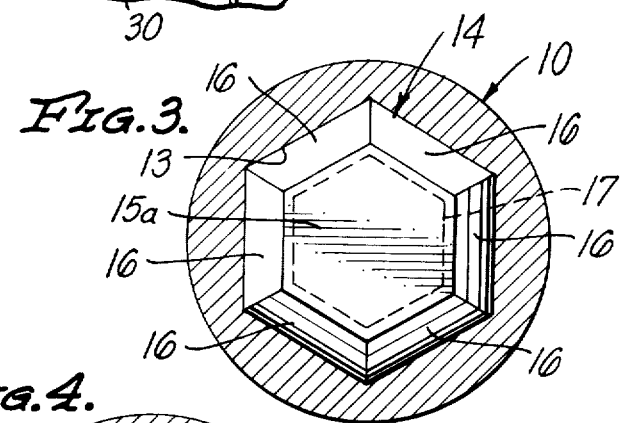
FIG. 3 is a sectional view taken on line 3—3 of FIG. 2.
Figure 4:
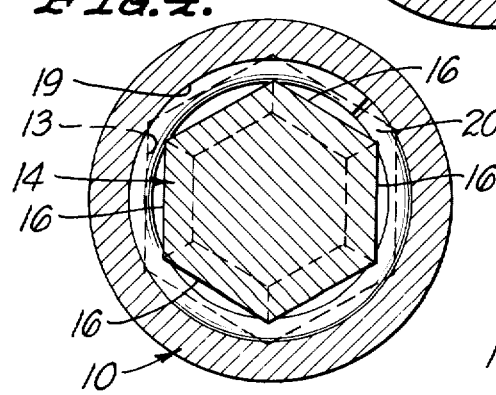
FIG. 4 is a sectional view taken on line 4—4 of FIG. 2.
Figure 6:
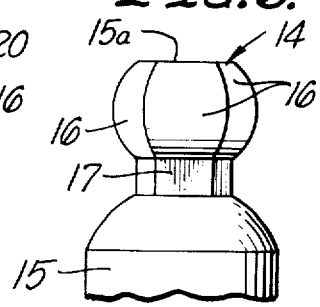
FIG. 6 is a side elevational view of the upper portion of the lower member, partly rotated from the position shown in FIG. 5.
Figure 5:
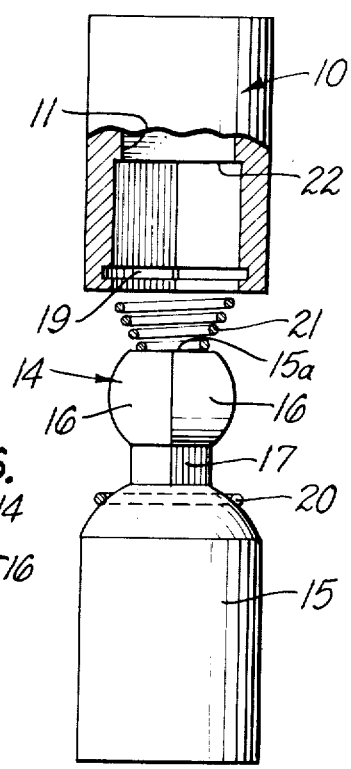
FIG. 5 is an exploded view similar to FIG. 2, with the lower portion of the upper member broken away and shown in section.

A preferred embodiment which has been selected to illustrate my invention comprises an attachment 10, which has at the upper end thereof an open socket 11 preferably of square cross section for removable attachment to the drive member of a tool. The inside walls of the socket 11 are provided with dimples 12 for receiving conventional springurged balls which are used in making tool driving connections.

The lower end of the attachment 10 has a hexagonal socket 13. Mounted within the socket 13 is what may be termed a hex-ball 14, which comprises the integral upper end of a drive member 15. The hex-ball 14 has a flat top 15a and six sides 16, each of which is arcuate or spherical along its longitudinal axis or cross-section (vertical in the drawings). The hex-ball 14 is hexagonal along any transverse axis or cross-section (horizontal in the drawings).

Between the hex-ball 14 and the main body of the drive member 15 is a hexagonal neck 17 of somewhat smaller dimension. The opposite end of the drive member 15 carries a conventional hexagonal socket 18 for engaging a hexagonal nut or fastening member or the like.

The lower end of the socket 13 of attachment 10 is provided with a circular groove 19, within which is removably mounted a split-ring spring 20, which acts to hold the hexball 14 within the socket 13. A coil spring 21 is mounted within the inner portion of the socket 13 between the inner end of the hex-ball 14 and a shoulder 22 which defines the inner end of the socket 13. The coil spring 21 exerts pressure against the inner end of the hex-ball to hold the hex-ball 14 against undesired angular movement. It accordingly prevents flopping movement of the drive member 15 with respect to the attachment 10.

In use, the device may be used as a universal socket for hand or power tools. It may be used in places and circumstances where a conventional socket for tool extension cannot reach or cannot be disposed at the proper angle. FIG. 1 of the drawings shows a typical example in which the drive member 15 is pivoted at an angle to engage the head of a fastening member 30, while the attachment 10 and the shaft 31 to which it is connected extend in a vertical direction.

The rounded side walls of the hex-ball 14 permit it to pivot to any angle whatsoever with respect to the attachment 10. At the same time, the hex-ball 14 cannot rotate with respect to the attachment 10. Any rotational movement of the attachment 10 exerts substantially equal pressure against all six corners of the hex-ball 14 to cause it to rotate along with the attachment 10.

It should particularly be noted that no pins are used to hold the hex-ball 14 against rotation and the division of pressure equally between all of the six corners makes it almost impossible for the device to break in use.

It should be understood that the size and number of sides of the sockets 11 and 18 may be varied as required to fit the particular drive members and fastening members with which the device is used. These changes do not in any way affect the structure and operation of the hex-ball 14 and socket 13. The invention is also capable of other uses and applications where pivotal or angular movement of one member with respect to another is required or desired, while relative rotational movement is not desired.

I claim:

1. A device of the class described which comprises an attachment adapted for rotation, a hexagonal socket formed in one end of said attachment, said socket having six substantially straight sides joined by six corners, a hex-ball member having six sides and six corners, said hex-ball member being mounted within said socket, the sides of said hex-ball member being of arcuate configuration along their longitudinal axes, said hex-ball member being pivotable to any desired angle with respect to said attachment, said corners of said hex-ball member being adapted to fit within and engage the corners of said socket to prevent rotation of said hex-ball member within said socket, a drive member connected to said hex-ball member, said drive member having socket means for engaging the head of a fastening member, said attachment having socket means at the opposite end thereof for removable connection to a tool drive member or the like, and means for preventing free tilting movement of said hex-ball member within said socket, said means comprising a coil spring mounted within said attachment, the end of said hex-ball member facing toward said attachment being flat, one end of said coil spring engaing said flat end of said hex-ball member and exerting pressure thereon to hold said hex-ball member in any angular position to which it is moved, thereby preventing undesired angular movement of said drive member with respect to said attachment, said attachment having means for retaining said hex-ball member substantially permanently within said socket, said means comprising a groove extending around the outer end of said socket and a split-ring spring mounted in said groove, said hex-ball member being unremovable from said socket without first removing said split ring.

* * * * *